(12) United States Patent  (10) Patent No.:  US 12,696,171 B2

Morte Palacios et al.  (45) Date of Patent:  Jul. 28, 2026

(54) DOWNLINK ROUTING SOLUTION FOR WIRELESS COMMUNICATION NETWORKS

(71) Applicant: Wirepas Oy, Tampere (FI)

(72) Inventors: Jorge Morte Palacios, Barcelona (ES); Hannu Hirvi, Tampere (FI); Juho Pirskanen, Kangasala (FI)

(73) Assignee: Wirepas Oy, Tampere (FI)

( * ) Notice: Subject to any disclaimer, the term of this patent is extended or adjusted under 35 U.S.C. 154(b) by 328 days.

(21) Appl. No.: 18/475,886

(22) Filed: Sep. 27, 2023

(65) Prior Publication Data

US 2024/0114429 A1  Apr. 4, 2024

(30) Foreign Application Priority Data

Sep. 28, 2022  (FI) ...................................... 20225851

(51) Int. Cl.
  *H04W 40/24*  (2009.01)

(52) U.S. Cl.
  CPC ................................. *H04W 40/248* (2013.01)

(58) Field of Classification Search
  CPC ..... H04L 61/50; H04L 61/5014; H04L 45/02; H04L 61/59; H04W 84/18; H04W 84/005;
  (Continued)

(56) References Cited

U.S. PATENT DOCUMENTS 8,064,363 B2  11/2011 Kohvakka
10,499,264 B1  12/2019 Juven
(Continued)

FOREIGN PATENT DOCUMENTS

EP  1324532 A2  2/2003
WO  2018117924 A1  6/2018
WO  2022081845 A2  4/2022

OTHER PUBLICATIONS

ETSI TR 103 777 V0.0.3 (Feb. 2023) Digital Enhanced Cordless Telecommunications (DECT); DECT-2020 New Radio (NR) inter-face; Study of additional functionality for the support of new applications in further releases. Section 5.6.2, 25 pages.

(Continued)

*Primary Examiner* — Jung Liu

(74) *Attorney, Agent, or Firm* — Meunier Carlin & Curfman LLC

(57)  ABSTRACT

Routing system is disclosed. The system comprises one or more head devices participating in routing operations and one or more destination devices. Each head device has one or more member devices. At least one head device is configured to in response to receiving from a member device an uplink data packet $DP_U$, forward the $DP_U$ and store into a routing table linkage information representing a linkage of a destination device generated the $DP_U$ to the member device. In response to receiving a downlink data packet $DP_D$ addressed to a destination device, forward the $DP_D$ only to its member device to which the destination device, to which the $DP_D$ is addressed, is linked based on the routing table, if linkage information related to the destination device, to which the $DP_D$ is addressed, is stored in the routing table. Also routing methods, head device, computer program, and computer readable medium are disclosed.

19 Claims, 4 Drawing Sheets

(58) Field of Classification Search
CPC ... H04W 88/085; H04W 40/12; H04W 40/22; H04W 40/36
See application file for complete search history.

(56) References Cited

U.S. PATENT DOCUMENTS

| 12,439,321 | B2 * | 10/2025 | Tesanovic | H04W 40/22 |
|---|---|---|---|---|
| 2013/0242929 | A1 | 9/2013 | Goergen et al. | |
| 2018/0070284 | A1 | 3/2018 | Ko | |
| 2019/0208512 | A1 | 7/2019 | Hirvi et al. | |
| 2019/0394654 | A1 | 12/2019 | Gardner | |
| 2020/0045610 | A1 * | 2/2020 | Shih | H04L 45/28 |
| 2020/0366607 | A1 | 11/2020 | Kommula et al. | |
| 2020/0413457 | A1 * | 12/2020 | Hong | H04W 76/10 |
| 2021/0044958 | A1 * | 2/2021 | Abedini | H04W 8/14 |
| 2021/0058826 | A1 * | 2/2021 | Mao | H04W 28/0933 |
| 2021/0075496 | A1 * | 3/2021 | Mildh | H04W 40/22 |
| 2021/0250804 | A1 * | 8/2021 | Chen | H04W 72/52 |
| 2021/0259051 | A1 * | 8/2021 | Latheef | H04W 76/12 |
| 2021/0321467 | A1 * | 10/2021 | Hampel | H04W 72/20 |
| 2021/0360470 | A1 * | 11/2021 | Chen | H04W 28/0278 |
| 2022/0015000 | A1 * | 1/2022 | Fujishiro | H04W 40/24 |
| 2022/0078663 | A1 * | 3/2022 | Luo | H04L 47/283 |
| 2022/0166703 | A1 * | 5/2022 | Xu | H04L 61/50 |
| 2022/0182917 | A1 * | 6/2022 | Muhammad | H04W 40/248 |
| 2022/0248495 | A1 * | 8/2022 | Mildh | H04W 76/11 |
| 2022/0264383 | A1 * | 8/2022 | Teyeb | H04W 36/0061 |
| 2022/0345977 | A1 * | 10/2022 | Arngren | H04W 40/12 |
| 2023/0232294 | A1 * | 7/2023 | Teyeb | H04W 36/0235 |
| | | | | 370/331 |
| 2023/0247504 | A1 * | 8/2023 | Haustein | H04W 76/19 |
| | | | | 455/436 |
| 2023/0397084 | A1 * | 12/2023 | Shah | H04W 40/12 |
| 2024/0163759 | A1 * | 5/2024 | Bae | H04W 36/0072 |
| 2024/0187950 | A1 * | 6/2024 | Kim | H04W 36/08 |
| 2024/0324039 | A1 * | 9/2024 | Wu | H04W 36/12 |
| 2024/0414610 | A1 * | 12/2024 | Belleschi | H04W 36/0033 |
| 2025/0184824 | A1 * | 6/2025 | Mukherjee | H04W 76/11 |

OTHER PUBLICATIONS

Search Report for priority Finnish Application No. 20225851, completed May 17, 2023, 2 pages.
European Search Report on corresponding European application EP 23200056. Dated on Jan. 26, 2024. 3 pages.
Bargaoui, H., Mbarek, N., Togni, O., Frikha, M. 2016. Hybrid QoS based routing protocol for inter and intra wireless mesh infrastructure communications. Wireless News 22: 2111-2130.
DECT-2020 New Radio (NR); Part 5: DLC adn Covergence layers: Release 1. ETSI TS 103636-5 V1.3.3. Aug. 2022. 53 pages.
Wirepas Oy. Downlink routing enhancement for REI2. Nov. 19, 2022. 10 pages.
DECT-2020 New Radio (NR); Part 5: DLC and Convergence layers; Release 1. ETSI TS 103 636-5 V1 3.3 (Aug. 2022) [online], Aug. 4, 2022,. 53p.
International search report of correpsonding applicaiton PCT/FI2023/050546, mailed on Dec. 14, 2023. 5p.
Extended European Search Report for European Application No. EP23200056.2, dated Feb. 6, 2024, 11 Pages.

* cited by examiner

DOWNLINK ROUTING SOLUTION FOR WIRELESS COMMUNICATION NETWORKS

TECHNICAL FIELD

The invention concerns in general the technical field of wireless communication networks. Especially the invention concerns data packet routing in the wireless communication networks.

BACKGROUND

Some, wireless communication network topologies, e.g. Wireless Sensor Networks (WSNs) and wireless communication networks complying Digital European Cordless Telecommunications (DECT-2020) standard, may support high device densities and autonomous routing to provide an ability to quickly adapt to any changes in a device environment and propagation conditions. In such networks, the autonomous routing is based on a cost value of routes. This provides an efficient path in an uplink direction for the devices. Routing solutions based on comprehensive routing tables need to propagate any new routing information to each affected router device in the wireless communication network, when any changes occur in the device environment, or alternatively the route needs to be obtained by each affected router device, when a new packet is to be sent. These will result in excessive transmissions that may collapse the wireless communication network.

Typically, devices used for Internet of Thinks (IoT) have strong limitations in terms of processing power, energy consumption and memory. Therefore, it is not affordable in terms of a network traffic overhead, a power consumption, and memory requirements to keep track of a route of each device in the routing tables of each routing device. In the wireless communication network using the autonomous cost-based routing, a device knows the next hop to reach a sink device with the most efficient path, when the device sends an uplink data packet in an uplink direction. The sink device operates as a radio interface for a gateway device, which in turn operates as a gateway between the wireless communication network and one or more external networks. However, in a downlink direction, there is no information about the direct path to reach the device.

One solution is to use a flooding mechanism, where a downlink packet is forwarded to all devices operating in a routing mode to reach the destination device. FIG. 1 illustrates schematically an example of a flooding-based downlink routing of a downlink data packet, wherein a downlink packet is to be transmitted from a sink device 102 to a destination device 106. The flooding-based routing in the example of FIG. 1 is a member limited flooding, which is as a special case of the flooding. In the example of FIG. 1 the destination device 106 is a non-router device. Other non-router devices of the wireless communication network 100 are referred with a reference number 108. The topology of the wireless communication network 100 of the example of FIG. 1 is a cluster tree topology. The downlink packet is forwarded to all router devices 104, i.e. flooded, regardless of the destination device 106 is reached. Only the non-router devices (i.e. leaf nodes) 108 and possible router devices 104 behind the destination device 106, if the destination device 106 is a router device having router member devices, may not be concerned in the flooding. Therefore, the flooding mechanism is inefficient, consuming energy and spectral resources due to unnecessary transmitting and receiving duties. The performance of the wireless communication network degrades exponentially as the size of the wireless communication network increases due to the additional transmissions forwarded to branches of the wireless communication network, where the destination device is not present. Branching in the wireless communication network topology grows exponentially as the size of the wireless communication network and the number of hops increases, making flooding routing less efficient. According to a non-limiting example, a fully loaded wireless communication network with 3 hops, where each device with less than 3 hops is a routing device and 5 devices are connected to each routing device. This means that there are a total of 2500 devices in the wireless communication network. Ideally, to transmit a packet to a destination device 3 hops away, only 4 transmissions are needed. However, when the flooding mechanism is used the wireless communication network generates 1875 transmissions (one per routing device) in total.

Some, IoT applications, e.g. WSNs focused on data collection, may require very little downlink traffic, so the inefficiency of the flooding-based routing in the downlink direction is not an obstacle in all situations. However, there are many situations where downlink traffic requirements increase. For example, in situations where an end-to-end reliability is needed using an end-to-end Automatic Repeat Request (ARQ), where some downlink traffic may be generated every time a device sends packets to the uplink direction. Also, for example delivering a configuration package to a device, wherein the configuration package is too large for a single radio link packet causes multiple of downlink routing needs—per device. Thus, it is important to keep the number of transmissions as low as possible so as not to overload the wireless communication network.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a routing system, routing methods, a head device, a computer program, and a computer readable medium for a wireless communication network for a wireless communication network. Another objective of the invention is that the routing system, the routing methods, the head device, the computer program, and the computer readable medium for a wireless communication network for a wireless communication network improve downlink data packet routing efficiency in the wireless communication network.

The objectives of the invention are reached by a routing system, routing methods, a head device, a computer program, and a computer readable medium as defined by the respective independent claims.

According to a first aspect, a routing system for a wireless communication network comprising a plurality of communication devices is provided, wherein the routing system comprises: one or more head devices participating in routing operations in the wireless communication network, each head device having one or more member devices, and one or more destination devices, wherein the one or more head devices, the one or more member devices, and the one or more destination devices belong to the plurality of communication devices, and wherein at least one head device of the one or more head devices is configured to: in response to receiving from a member device belonging to its one or more member devices an uplink data packet generated by a destination device belonging to the one or more destination devices, forward the received uplink data packet in the uplink direction and store into a routing table linkage information representing a linkage of said destination device to said member device; in response to receiving a downlink data packet addressed to a destination device belonging to the one or more destination devices, forward the downlink data packet only to its member device to which the destination device, to which the downlink data packet is addressed, is linked based on the routing table of the head device, if linkage information related to the destination device, to which the downlink data packet is addressed, is stored in the routing table of the head device; and update the routing table, wherein the updating of the routing table comprises prioritizing the storing of the linkage information based on Quality of service (QoS) value comprised in the linkage information and/or downlink response information comprised in the linkage information.

Furthermore, if the linkage information related to the destination device, to which the downlink data packet is addressed, is not stored in the routing table of the head device, the head device may be configured to: forward the received downlink data packet to all its router member devices, or broadcast the received downlink data packet to all communication devices within its radio range including its router member devices.

The linkage information may comprise at least information linking an address of said destination device to an address of said member device.

The at least one head device may be a router device operating in a router role in the wireless communication network or a sink device configured to operate as a radio interface for a gateway device operating as a gateway between the wireless communication network and one or more external networks.

The head device being the sink device may be configured to store the routing table into or to send the routing table to be stored in a memory unit of a managing entity of the one or more external networks.

Alternatively or in addition, the updating of the routing table may comprise: removing the stored linkage information from the routing table based on time elapsed from the storing of said linkage information; updating previously stored linkage information with new linkage information in response to receiving the new linkage information; removing oldest linkage information from the routing table, if a maximum size of the routing table is reached; and/or learning when storing of new linkage information should be done based on a routing header of a packet header of the received uplink data packet.

The downlink response information may indicate whether a downlink response is required or not.

The downlink response information may comprise a higher layer protocol indication indicating that a downlink response is expected.

The higher layer protocol indication may comprise an indication that the uplink data packet is an uplink Automatic Repeat Request (ARQ) poll packet.

Alternatively or in addition, the uplink data packet may comprise a hop-count field comprising a hop-count value, the hop-count value is incremented by every router device of the wireless communication network that forwards the uplink data packet.

Furthermore, the downlink data packet may comprise a downlink hop-limit field comprising a hop-limit value, wherein the hop-limit value may initially be adapted to correspond to the cumulated hop-count value comprised in the hop-count field of the uplink data packet.

In addition, the hop-limit value may be decremented by every router device of the wireless communication system that forwards the downlink data packet, and when a router device of the wireless communication system receives the downlink data packet with the hop-count value being zero, said router device may not forward the downlink data packet, unless the downlink data packet is addressed to a member device of said router device.

The destination device may be configured to generate the uplink data packet in response to receiving a downlink indication packet.

The downlink indication packet may be delivered to the destination device by flooding, and after receiving the uplink data packet generated by the destination device in response to receiving the downlink indication packet the head device may be configured to forward one or more subsequent downlink data packets addressed to the destination device based on the linkage information stored in the routing table of the head device.

According to a second aspect, a wireless communication network is provided, wherein the wireless communication network comprises the routing system as described above.

According to a third aspect, a routing method for a wireless communication network is provided, wherein the method comprises following steps of: presenting one or more head devices participating in routing operations in the wireless communication network, each head device having one or more member devices, and one or more destination devices, wherein the one or more head devices, the one or more member devices, and the one or more destination devices belong to a plurality of communication devices of the wireless communication network; in response to receiving, by at least one head device, from a member device belonging to its one or more member devices an uplink data packet generated by a destination device belonging to the one or more destination devices, forwarding, by the at least one router device, the received uplink data packet in the uplink direction and storing into a routing table linkage information representing a linkage of said destination device to said member device; in response to receiving, by the at least one head device, a downlink data packet addressed to a destination device belonging to the one or more destination devices, forwarding, by the at least one head device, the downlink data packet only to its member device to which the destination device, to which the downlink packet is addressed, is linked based on the routing table of the head device, if linkage information related to the destination device to which the downlink data packet is addressed, Is stored in the routing table of the head device; and updating, by the at least one head device, the routing table, wherein the updating of the routing table comprises prioritizing the storing of the linkage information based on Quality of service (QoS) value comprised in the linkage information and/or downlink response information comprised in the linkage information.

According to a fourth aspect, a head device for a wireless communication network is provided, wherein head device is configured to participate in routing operations in the wireless communication network, the head device comprises: a controller, and a radio communicator for operating as a radio node device, wherein the head device is configured to: in response to receiving, by the radio communicator, from a member device belonging to its one or more member devices an uplink data packet generated by a destination device, forward, by the radio communicator, the received uplink data packet in the uplink direction and store, by the controller, into a routing table linkage information representing a linkage of said destination device to said member device; in response to receiving, by the radio communicator, a downlink data packet addressed to a destination device, forward, by the radio communicator, the downlink data packet only to its member device to which the destination device, to which the downlink data packet is addressed, is linked based on the routing table of the head device, if linkage information related to the destination device, to which the downlink data packet is addressed, is stored in the routing table of the head device; update, by the controller, the routing table, wherein the updating of the routing table comprises prioritizing the storing of the linkage information based on Quality of service (QoS) value comprised in the linkage information and/or downlink response information comprised in the linkage information.

According to a fifth aspect, a routing method for the head device described above is provided, wherein the method comprises following steps of: in response to receiving, by a radio communicator of the head device, from a member device belonging to its one or more member devices an uplink data packet generated by a destination device, forwarding, by the radio communicator of the head device, the received uplink data packet in the uplink direction and storing, by the controller of the head device, into a routing table linkage information representing a linkage of said destination device to said member device; in response to receiving, by the radio communicator of the head device, a downlink data packet addressed to a destination device, forwarding, by the radio communicator of the head device, the downlink data packet only to its member device to which the destination device, to which the downlink data packet is addressed, is linked based on the routing table of the head device, if linkage information related to the destination device, to which the downlink data packet is addressed, is stored in the routing table of the head device updating, by the controller of the head device, the routing table, wherein the updating of the routing table comprises prioritizing the storing of the linkage information based on Quality of service (QoS) value comprised in the linkage information and/or downlink response information comprised in the linkage information.

According to a sixth aspect, a computer program is provided, wherein the computer program comprises instructions, which, when the computer program is executed by a computer, cause the computer to carry out at least the steps of the method as described above.

According to a seventh aspect, a tangible, non-volatile computer readable medium is provided, wherein the computer readable medium comprises the computer program described above.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1:
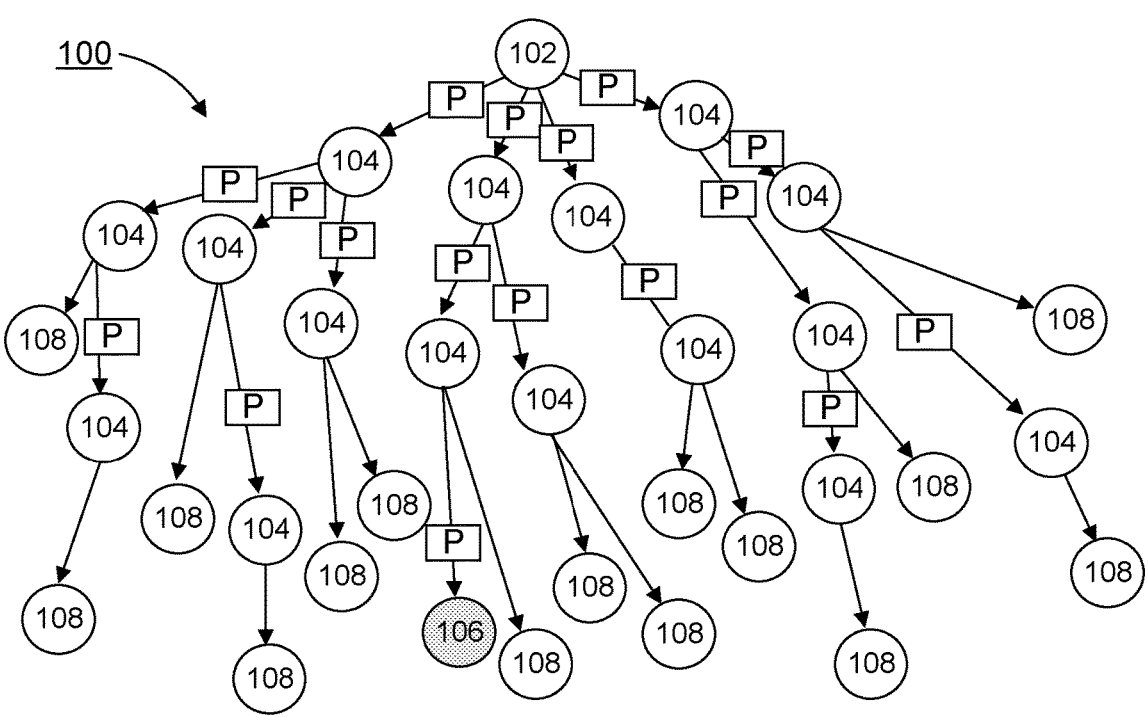
FIG. 1 illustrates schematically an example of a flooding-based downlink routing of a downlink data packet.
Figure 2:
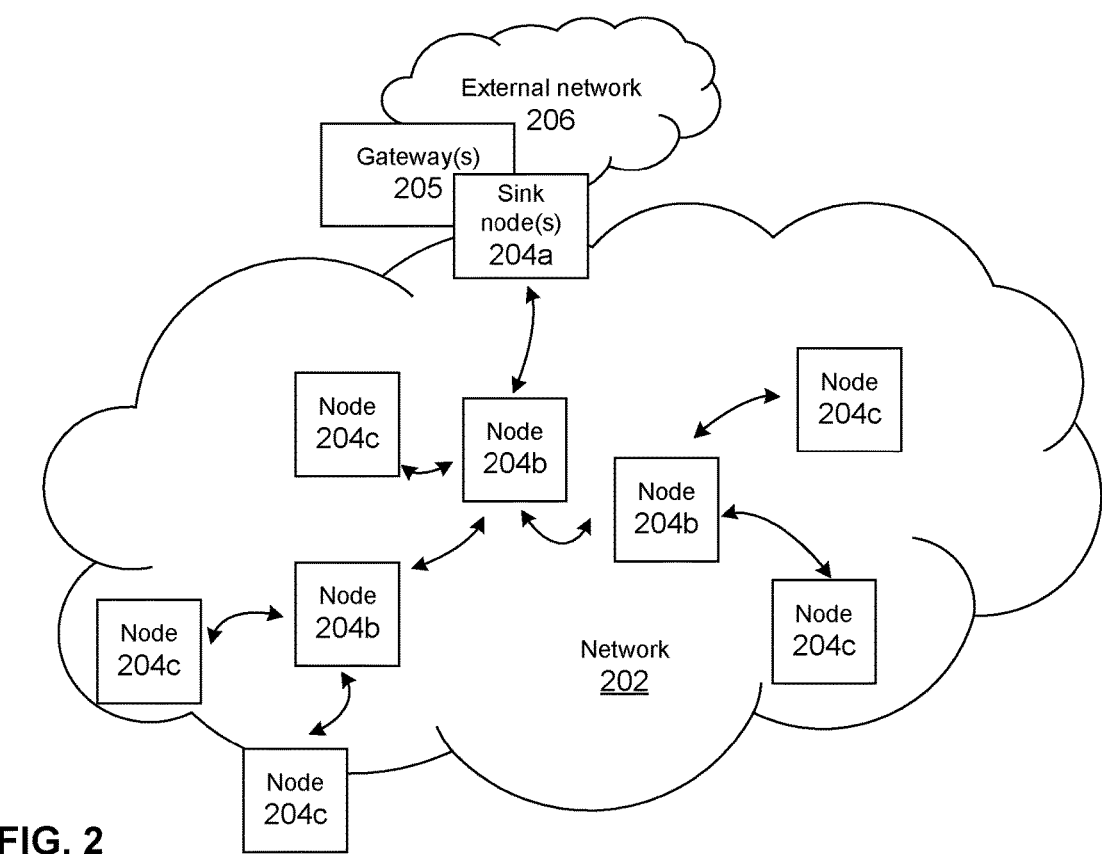
FIG. 2 illustrates an example a wireless communication environment in which a routing system may operate.

FIG. 2 illustrates an example a wireless communication environment in which a routing system 300 may operate. The environment comprises a wireless radio communication network (system) 202, which comprises a plurality of wireless radio communication devices (nodes) 204a, 204b, 204c. The devices 204a, 204b, 204c operate on a same spectrum comprising one or more frequency bands at a same geographical area, e.g. within the presented environment. Each of the one or more frequency bands may comprise one or more frequency channels. The use of same spectrum enables a bidirectional radio communication between the devices 204a, 204b, 204c in the network 202, whereupon radio transmissions transmitted by one device 204a, 204b, 204c may be received by another device 204a, 204b, 204c and vice versa.

The routing system 300 may be applied to any wireless radio communication network 202 that uses packet transmissions in the communication, i.e. in data exchange. Preferably, the routing system 300 may be applied to any wireless radio communication network that may be used for multi-hop communication between the devices 204, i.e. the packets may be delivered over at least two consecutive radio links. The routing system 300 may be applied in wireless communication networks 202 complying Digital European Cordless Telecommunications (DECT-2020 NR) standard. Some non-limiting examples to which the routing system 300 may also be applied may comprise, but is not limited to, a wireless multi-hop network, a wireless mesh network, e.g. wireless sensor network (WSN), a Bluetooth Low Energy (BLE) mesh network, a Zigbee network, a Thread network, a Public Land Mobile Network (PLMN), a Wireless Local Area Network (WLAN), a Low Power Wide Area Network (LPWAN), a cellular based local area network, a cellular network, and/or any other wireless networks. One example of WSN is explained in patent publication U.S. Pat. No. 8,064,363 B2.

The DECT-2020 NR standard is a radio access technology developed by ETSI. The DECT-2020 NR supports massive machine-type communication (mMTC) and ultra reliable low latency communication (URLLC). On Physical (PHY) layer, the key technology components of the DECT-2020 NR are Orthogonal frequency-division multiplexing (OFDM), adaptive modulation and coding schemes (MCS), Modern Channel coding methods (Turbo, LDPC, Convolutional coding), Hybrid Automatic Repeat Request (HARQ) for both scheduled and contention-based transmissions, and a support of multi-antenna transmissions with different Multiple-Input and Multiple-Output (MIMO) streams. On Medium access (MAC) layer and from system aspects, the key technology components of the DECT-2020 NR are a support of high number of Internet of Things (IoT) sensors, actuators, and other industrial applications; support of Mesh network topology, support of URLLC communication with very short delay (typical application may be wireless microphones); operation on frequencies that are license exempt; and support of multiple overlapping non-coordinated networks with cognitive radio capabilities to share spectrum resources between multiple networks.

As above has been explained, each device 204a, 204b, 204c is able to provide, by means of its radio communicator 636, the bi-directional radio communication with at least one other device 204a, 204b, 204c. This means that each device 204a, 204b, 204c may operate as a transmitter, as a receiver, or as a transmitter-receiver when each device 204a, 204b, 204c is able to transmit at least one message to other device(s) 204a, 204b, 204c and to receive at least one message from the other device(s) 204a, 204b, 204c in the network 202.

The network 202 may also comprise at least one gateway device 205, e.g. one, two, three, four, or more gateway devices. Each gateway device 205 operates as a gateway between the network 202 and other external network(s) 206, e.g. Internet, and delivers data in the network 202 and from the network 202. Each gateway device 205 communicates with at least one sink device (node) 204a, e.g. one, two, three, four, or more sink devices, and each sink device 204a operates as a radio interface for the gateway device 205 in the network 202. The at least one sink device 204a belongs to the plurality of devices 204a, 204b, 204c of the network 202. Each sink device 204a may locate physically in connection with the gateway device 205 or separately in a different part of the network 202. If the gateway 205 comprises several sink devices 204a, one may locate in connection with the gateway device 205 and others separately in different parts of the network 202.

The sink device(s) 204a typically has a specific role to route data packets from the network 202 to the gateway device 204 and/or into the network 202. The sink role does not need to be fixed, but the sink device 204a may change its role into a router role, e.g. if the connection to the gateway device 205 is lost or if the gateway device 205 is not able to provide the service, e.g. the gateway device 205 has lost its connection to the Internet. The other node devices 204b, 204c are able to operate in different fixed or non-fixed roles in the network 202. The other devices 204b, 204c in the network 202 are router devices (routers) 204b, i.e. devices operating in a router role, and non-router devices (non-routers) 204d, i.e. devices operating in a non-router role, depending on whether a device needs to participate in data packet forwarding. One method for selecting router and non-router roles may be e.g. in accordance with the method explained in patent publication U.S. Pat. No. 10,499,264. The sink devices 204a and the router devices 204b of the network 202 may participate in routing operations, i.e. in the routing of the data packets.

Each router device 204b maintains a connectivity of the network 202 and routes (forwards) data (e.g. data packets) of other devices 204a, 204b, 204c when necessary. Each non-router device 204c is able to provide a bi-directional communication in order to transmit its own data (e.g. data packets) and to receive data (e.g. data packets) directed for it similarly as sink 204a and router devices 204b, but the non-router device 204c does not route data (e.g. data packets) of other devices 204a, 204b, 204c. Each device of the network 202 may be able to operate at least as a router 204b or a non-router device 204c. Alternatively, at least part of the devices of the network may be able to operate as a router 204b or non-router device 204c, and one or more of the devices of the network 202 may be able to operate only as a router device 204b or only as a non-router device 204c.

The network 202 comprises the devices 204b, 204c so that all devices 204b, 204c are not able or not preferring to communicate directly with the sink device(s) 204a due to radio conditions, e.g. extensive distance between the devices 204a, 204b, 204c, interference or signal fading between the devices 204a, 204b, 204c; or a limited radio range, whereupon it is necessary or preferred by the devices 204a, 204b, 204c to use multi-link (multi-hop) communication between each device 204b, 204c and the sink device 204a.

Uplink data packets generated by one or more of the plurality of communication devices of the wireless communication network 202 are routed in an uplink direction in the wireless communication network 202, i.e. outwards from wireless communication network 202, e.g. to the one or more external networks 206. Downlink data packets generated for one or more of the plurality of communication devices of the wireless communication network 202 are routed in a downlink direction in the wireless communication network 202, i.e. into the wireless communication network 202, e.g. from the one or more external networks 206.

Figures 3A, 3B, 3C, 3D:
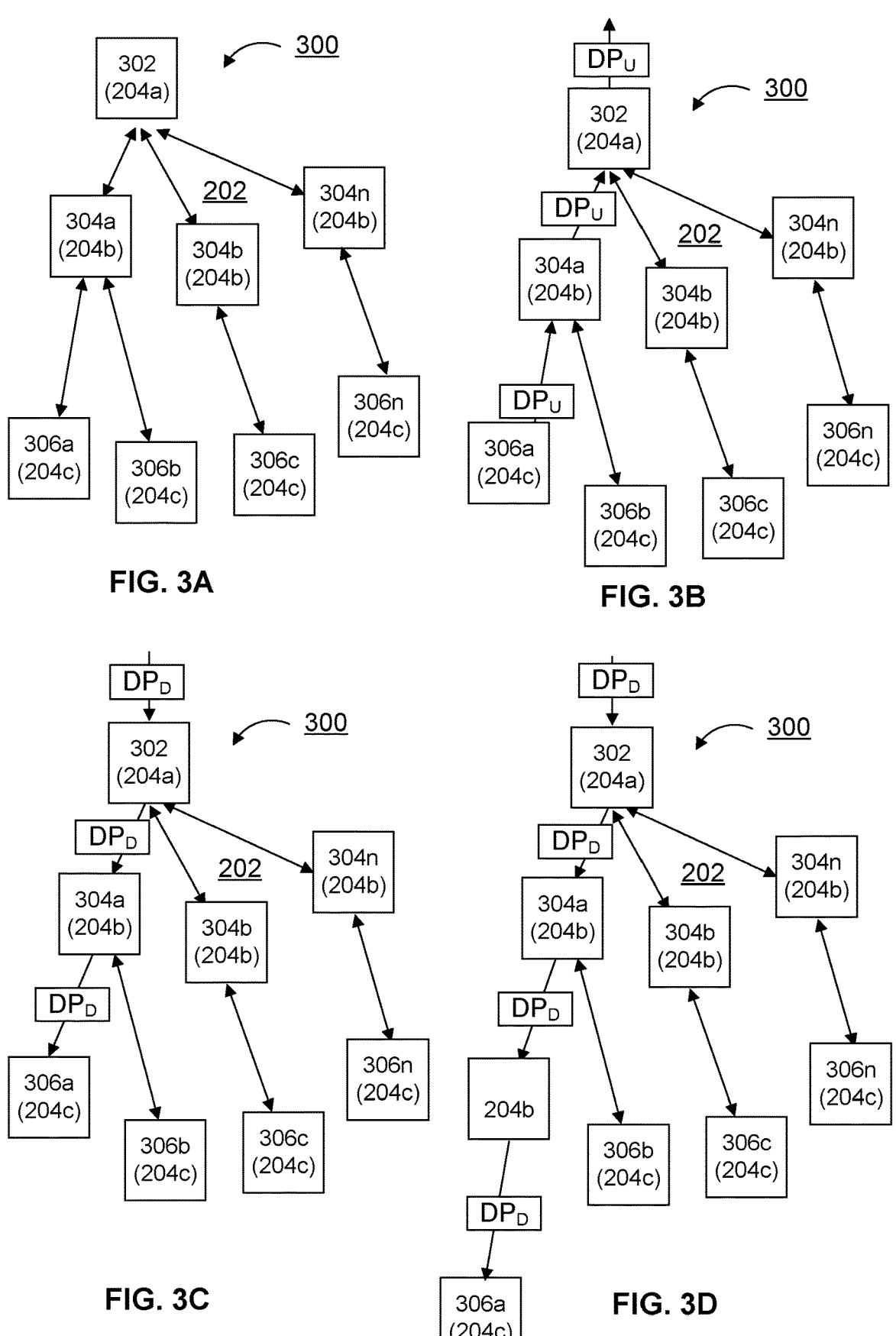
FIG. 3A schematically illustrates an example of the routing system, which operates in the wireless communication network.
FIG. 3B illustrates schematically an example of an uplink routing of an uplink data packet by the routing system in an uplink direction of the wireless communication network.
FIG. 3C illustrates schematically an example of a downlink routing of a downlink data packet by the routing system in a downlink direction of the wireless communication network.
FIG. 3D illustrates schematically another example of the downlink routing of the downlink data packet by the routing system in the downlink direction of the wireless communication network.

FIG. 3A schematically illustrates an example of a routing system 300, which operates in the wireless communication network 202. The routing system 300 is used for routing uplink data packets and downlink data packets in the wireless communication network 102. The level of hops in the routing system 300 is not limited, i.e. the routing system 300 may have any level of hops, e.g. two, three, four, or more hops. In the example of FIG. 3A, the wireless communication network 202 is implemented in the cluster tree topology. However, the invention is not limited to that and the wireless communication network 202 may be implemented also in other topologies, e.g. a star topology, or other mesh topologies than the cluster tree, etc. The routing system 300 comprises one or more head devices 302 participating in the routing operations, wherein each head device 302 of the system 300 have one or more member devices 304a-304n. The one or more member devices 304a-304n may be associated with the respective head device 302 to operate as the member device of said head device 302. After the association, the head device 302 is aware of, i.e. knows, addresses of the one or more member devices 304a-304n of the head device 302. The routing system 300 further comprises one or more destination devices 306a-306n. In other words, the routing system comprises one or more head devices 302, one or more member devices 304a-304n of the one or more head devices 302, and one or more destination devices 306a-306n. The one or more head devices 302, the one or more member devices 304a-304n, and the one or more destination devices 306a-306n belong to the plurality of communication devices 204a, 204b, 204c of the wireless communication network 202. In the cluster tree topology implementation of the network 202, each destination device 306a-306n of the system 300 is in the same branch of the network 202 with one member device 304a-304n of the system 300. For example, in the example of FIG. 3A the destination devices 306a and 306b are in the same branch of the network 202 with the member device 304a, the destination device 306c is in the same branch of the network 202 with the member device 304b, and the destination device 306n is in the same branch of the network 202 with the member device 304n. In the example of FIG. 3A the destination devices 306a-306n are non-router devices 204c. However, the one or more destination devices 306a-306n of the routing system 300 may comprise router devices 204b and/or non-router devices 204c. In the example of FIG. 3A the member devices 304a-304n are router devices 204b. However, the one or more member devices 304a-304n of the routing system 300 may comprise router devices 204b, i.e. router member devices, and/or non-router devices 204c, i.e. non-router member devices. In the example of FIG. 3A the head device 302 is a sink device 204a. However, the one or more head devices 302 of the routing system 300 may comprise sink devices 204a and/or router devices 204b. The routing system 300 is explained from now on in this application mainly by using one head device 302 having one or more member devices 304a-304n, and one destination device 306a, which belong to the routing system 300, operate in the network 202, and form a group of devices 302, 304a-304n, 306a. These devices 302, 304a-304n, 306a however correspond with the devices 204a, 204b, 204c. The routing system 300 may also comprise a plurality of other devices 204a, 204b, 204c, 306b-306d, which also participate to a formation of said group, whereupon the group comprises devices 204, 204b, 204c, 302, 304a-304n, 306a, 306b-306d. The head device 302 may be a router device 204b or a sink device 204a.

Figures 3E, 3F, 4:
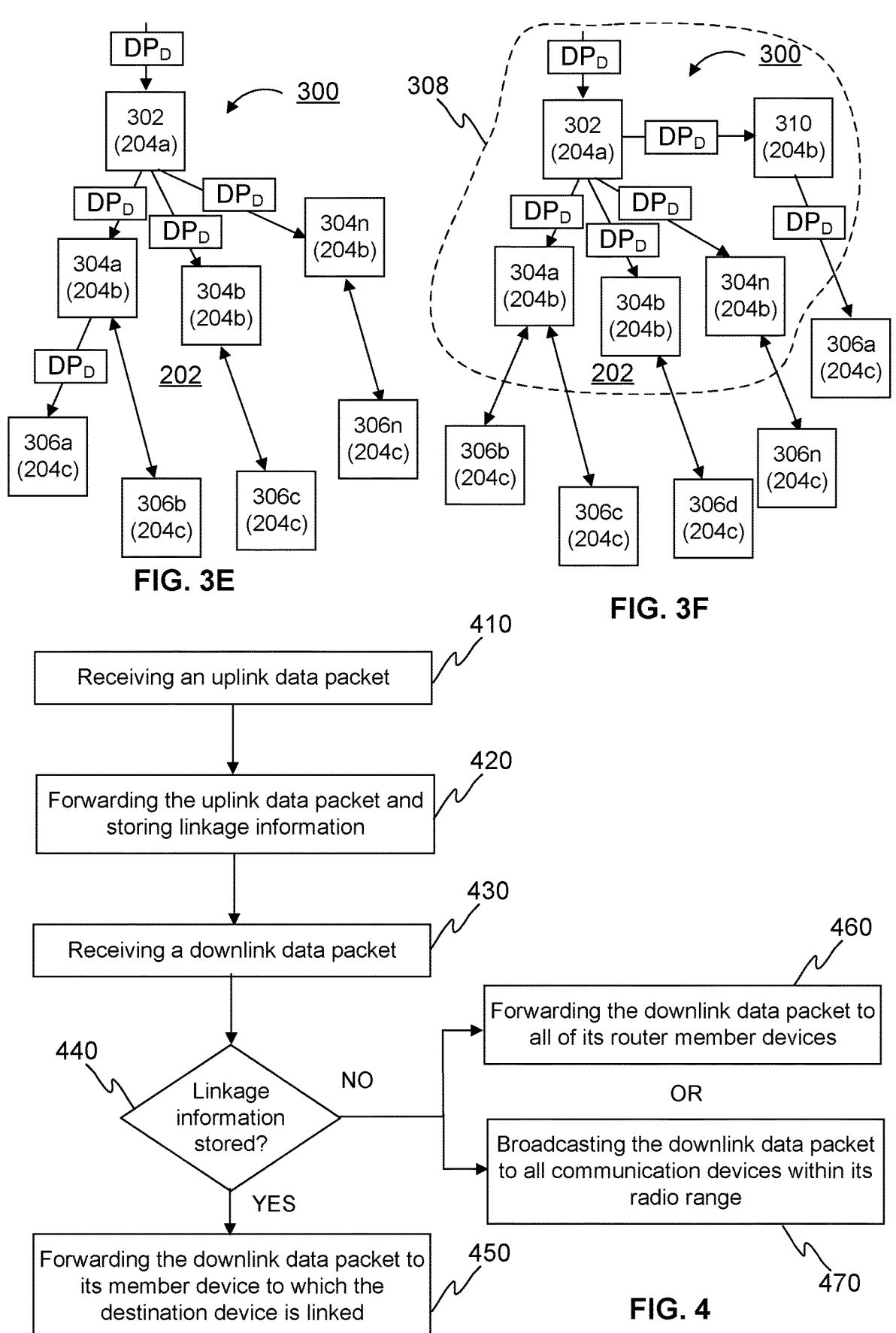
FIG. 3E illustrates schematically yet another example of the downlink routing of the downlink data packet by the routing system in the downlink direction of the wireless communication network.
FIG. 3F illustrates schematically yet another example of the downlink routing of the downlink data packet by the routing system in the downlink direction of the wireless communication network.
FIG. 4 illustrates schematically an example of a routing method for routing data packets in the wireless communication network by the routing system.

FIG. 4 illustrates schematically an example of a routing method for routing data packets in the wireless communication network 202 by the above discussed routing system 300. FIG. 4 illustrates the routing method as a flowchart. The routing method is mainly explained by using the routing system 300 comprising one head device 302 having one or more member devices 304a-304n, and one destination device 306a. The routing system 300 may additionally comprise at least one other head device 302, e.g. one, two, three, four, or more other head devices 302, each head device 302 having one or more member devices 304a-304n, e.g. one, two, three, four, or more member devices 304a-304n, and/or at least one destination device 306a-306n, e.g. one, two, three, four, or more destination devices 306a-

306n. Although the routing method is described by using the routing system 300 comprising one head device 302 having one or more member devices 304a-304n, and one destination device 306a, each head device 302 of the routing system 300 may be configured independently to perform one or more method steps (i.e. features) of the routing method relevant to head device 302 as will be explained for the one head device 302. Similarly, each member device 304a-304c of the routing system 300 may be configured independently to perform one or more method steps (i.e. features) of the routing method relevant to the one or more member devices 304a-304c as will be explained for the one or more member devices 304a-304c. Similarly, each destination device 306a-306n of the routing system 300 may be configured independently to perform one or more method steps (i.e. features) of the routing method relevant to the destination device 304a-304n as will be explained for the destination device 306a. The features of the routing method relevant to the head device 302 as will be explained may be applied (i.e. implemented) by at least one router device 204b of the network 202. Alternatively or in addition, the features of the routing method relevant to the head device 302 as will be explained may be applied by at least one sink device 204a of the network 202.

At a step 410, the head device 302 receives from a member device 304a belonging to its one or more member devices 304a-304n an uplink data packet $DP_U$ generated by a destination device 306a belonging to the one or more destination devices 306a-306n of the system 300. The uplink data packet $DP_U$ may for example comprise, but is not limited to, sensor measurement data and/or control data. The sensor measurement data may be reported periodically and/or at predefined events, e.g. if a temperature rises above a threshold level. The control data may for example comprise an acknowledgement in response to receiving a downlink packet, e.g. in the ARQ. FIG. 3B illustrates schematically an example of the uplink routing of the uplink data packet $DP_U$ by the routing system 300 in the uplink direction. The routing system 300 in the example of FIG. 3B corresponds to the routing system 300 of the example of FIG. 3A. In the example of FIG. 3B, the destination device 306a generates the uplink data packet $DP_U$ and forwards the generated uplink data packet $DP_U$ to the member device 304a being the next router device 204b in the same branch of the network 202 with the destination device 306a in the uplink direction. The member device 304a, in turn, in response to receiving the uplink data packet $DP_U$, forwards the uplink data packet $DP_U$ generated by the destination device 306a in the uplink direction to the head device 302, whose member the member device 304a is, and the head device 302 receives the uplink data packet $DP_U$ from the member device 304a. Alternatively, there may be at least one other router device 204b of the network 202 between the destination device 306a and member device 304a in the same branch of the network 202. In that case, the uplink data packet $DP_U$ is routed from the destination device 306a to member device 304a via said at least one other router device 204b of the network 202.

At a step 420, in response to receiving from the member device 304a the uplink data packet $DP_U$ generated by the destination device 306a at the step 410, the head device 302 forwards the received uplink data packet $DP_U$ in the uplink direction and stores into a routing table linkage information representing a linkage of said destination device 306a to said member device 304a. The linkage information may comprise any information that links the destination device 306a, which generated the uplink data packet $DP_U$, with the member device 304a, from which the head device 302 receives the uplink data packet $DP_U$ generated by the destination device 306a. The linkage information may for example comprise at least information linking an address of the destination device 306a to an address of the member device 304a. According to an example, the address of the destination device 306a and the address of the member device 304a may be Media Access Control (MAC) addresses. The linkage information may further comprise further information indicated in the received uplink data packet $DP_U$. For example, the further linkage information may comprise a hop-count value, a Quality of service (QoS) value, and/or downlink response information indicating whether a downlink response is required or not. The downlink response information may for example comprise a higher layer protocol indication indicating that a downlink response is expected, e.g. an indication that the uplink data packet $DP_U$ is an uplink ARQ poll packet. When a device, e.g. a first device, sends an ARQ poll packet (either uplink or downlink) to another device, e.g. a second device, the first device expects that the second device will send a response to said ARQ poll packet. The uplink ARQ poll packet may for example be sent in the uplink direction to obtain a reception status of the sent uplink data and/or to build or refresh a route for the response that is expected to come soon in the downlink direction. The downlink ARQ poll packet may for example be sent in the downlink direction to invite a device to send an uplink response which will build or refresh the route for possible further one or more downlink packets as will be discussed later in this application. This further linkage information may for example be utilized at least partly in updating the routing table as will be discussed later in this application. The head device 302 may store the routing table in a memory part of the head device 302. Alternatively, if the head device 302 is the sink device 204a, the head device 302 may store the routing table into or send the routing table to be stored in a memory unit, e.g. a database, of a managing entity (i.e. a backend) of the one or more external networks 206. The managing entity may be any computing entity, e.g. a cloud server. The linkage information to be stored in the routing table may be delivered to the managing entity via the gateway device 205. With the term "routing table" is meant throughout this application a generic information structure used for storing temporarily the linkage information into a memory of a communication device. In other words, the routing table may be fixedly stored, while the linkage information is temporarily stored in the routing table. The example of FIG. 3B shows the forwarding of the received uplink data packet $DP_U$ in the uplink direction by the head device 302. If the head device 302 is a router device 204b, the head device 302 forwards the received uplink data packet $DP_U$ to the next router device 204b in the same branch of the network 202 with the head device 302 in the uplink direction or to a sink device 204a, if the next device in the same branch of the network 202 with the head device 302 in the uplink direction is the sink device 204a. If the head device 302 is a sink device 204a, the head device 302 forwards the received uplink data packet $DP_U$ to the gateway device 205 which delivers the uplink data packet $DP_U$ outside the network 202 to the one or more external networks 206, e.g. to the managing entity of the one or more external networks 206.

According to an example, the head device 302 may update the routing table. The updating of the routing table may comprise removing the stored linkage information from the routing table based on time elapsed from the storing of said linkage information. Alternatively or in addition, the updating of the routing table may comprise updating previously stored linkage information with respective new linkage information in response to receiving said respective new linkage information. Alternatively or in addition, the updating of the routing table may comprise removing oldest linkage information from the routing table, if a maximum size of the routing table is reached. Alternatively or in addition, the updating of the routing table may comprise learning when storing of new linkage information into the routing table should be done based on a routing header of a packet header of the received uplink data packet $DP_U$. The routing header may for example comprise maximum storing time information indicating how long the linkage information may be considered to be valid and maintained by the head device 302. The destination device 306a may have added this maximum storing time information based on its own mobility history, i.e. how often it has changed its next hop head device, its knowledge of an application activity, i.e. how frequently it is supposed to send uplink data packets, or the QoS value. Alternatively or in addition, the routing header may for example comprise a current packet travel time information. The head device 302 may reduce the current packet travel time indicated in the routing header from the maximum storing time indicated in the routing header to obtain the same maximum storing time information as added by the destination device 306a to the routing header. According to a non-limiting example, if the destination device 306a sends an uplink data packet $DP_U$ and indicates in the routing header that the linkage information is considered to be valid one second, i.e. the maximum storage time information is one second, and that the current packet travel time is 100 microseconds, the head device 302 that receives the uplink data packet $DP_U$ may then define that the maximum storing time is now 900 microseconds. Alternatively or in addition, the updating of the routing table may comprise prioritizing the storing of the linkage information based on the QoS values, if the linkage information comprises the QoS value, and/or the downlink response information, if the linkage information comprises the downlink response information. For example, the linkage information comprising higher QoS value may be assigned with a higher priority than the linkage information comprising a lower QoS value. According to another example, the linkage information comprising the downlink response information indicating that the downlink response is required may be assigned with a higher priority than the linkage information comprising the downlink response information indicating that the downlink response is not required. For example, the linkage information relating to the ARQ poll packet may be prioritized over the linkage information relating to other data packets. The linkage information assigned with the higher priority may be prioritized in the storing of the linkage information. In other words, the less prioritized linkage information, i.e. the linkage information with the lower priority, may be overwritten or dropped first, for example if the maximum size of the routing table is reached, e.g. due to a limited memory capacity. The destination device 306a may change it route to the head device 302 over time. The updating of the routing table enables to maintain the routing table up to date.

Alternatively or in addition, according to an example the head device 302 may store at the step 420 the linking information into the routing table only, if a response, e.g. a downlink data packet, to the received uplink data packet $DP_U$ generated by the destination device 306 is expected promptly. This is beneficial especially, if the head device 302 is the router device 204b of the network 202, because the amount of the linkage information the router device 204b may store into the routing table may be limited due to a limited memory capacity of the router device 204b. Typically, if the head device 302 is the sink device 204a, the memory capacity is not as limited as in the case of the head device 302 being the router device 204b, especially if the sink device 204a stores the routing table into or sends the routing table to be stored in the memory unit of the managing entity of the one or more external networks 206. The prompt response may for example be indicated in the uplink data packet $DP_U$. The indication of the prompt response may be an implicit indication or an explicit indication. According to a non-limiting example, the implicit indication of the prompt response may for example be included in an upper protocol layer. According to a non-limiting example, in the wireless communication networks 202 complying the DECT-2020 NR standard, the upper protocol layer may for example be a Convergence (CVG) layer. The head device 302 may inspect before storing the linkage information into the routing table at the step 420 the upper protocol layer to find out whether the received uplink data packet $DP_U$ requires a response and store the linkage information into the routing table only if the received uplink data packet $DP_U$ requires the response. According to another non-limiting example, the explicit indication of the response may for example be included in a data link control (DLC) layer, e.g. as a flag a routing header of the DLC layer to indicate that an application layer requires the response to the uplink data packet $DP_U$. The head device 302 may inspect before storing the linkage information into the routing table at the step 420 the DLC layer to find out whether the received uplink data packet $DP_U$ requires a response and store the linkage information into the routing table only if the received uplink data packet $DP_U$ requires the response.

At a step 430, the head device 302 receives a downlink data packet $DP_D$ addressed to a destination device 306a belonging to the one or more destination devices 306a-306b of the routing system 300. The downlink data packet $DP_D$ may for example comprise, but is not limited to, configuration data, control data, software update(s), a request to modify the sensor measurement data reporting (e.g. to change the threshold level for reporting the sensor measurement data discussed above), and/or a retransmission request (e.g. in the ARQ). In general, the sink devices 204a of the network 202 may generate the downlink data packets, i.e. the sink devices 204a may be the source devices of the downlink data packets. However, in some networks 202 some other devices 204b, 204c of the network 202 may also generate one or more downlink data packets. If the head device 302 is the router device 204b, the head device 302 may receive the downlink data packet $DP_D$ from the previous router device 204b in the same branch of the network 202 with the head device 302 in the downlink direction or from a sink device 204a, if the previous device in the same branch of the network 202 with the head device 302 in the downlink direction is the sink device 204a. If the head device 302 is a sink device 204a, the head device 302 receives the downlink data packet $DP_D$ via the gateway device 205 from the one or more external networks 206, e.g. from the managing entity of the one or more external networks 206. The addressing the downlink data packet $DP_D$ to the destination device 306a may for example comprise that the downlink data packet $DP_D$ comprises the address of the destination device 306a. According to a non-limiting example, in the wireless communication networks 202 complying the DECT-2020 NR standard, the routing header of the downlink data packet $DP_D$ may define a source address and a destination address, i.e. the address of the device originally generated the downlink packet $DP_D$ and the address of the destination device 306a to which the downlink packet $DP_D$ is addressed. According to another non-limiting example, in the wireless communication networks 202 complying the DECT-2020 NR standard, a MAC header of the downlink data packet $DP_D$ may define a one-hop transmitter address and a one-hop receiver address, i.e. the address of the device from which the downlink data packet $DP_D$ is received (the previous device in the same branch) and the address of the device receiving the downlink data packet $DP_D$.

At a step 440, after receiving the downlink data packet $DP_D$ addressed to destination device 306a at the step 430, the head device 302 defines whether linkage information related to the destination device 306a to which the received downlink packet $DP_D$ is addressed is stored in the routing table. In other words, the head device 302 looks whether the routing table comprises linkage information related to the destination device 306a to which the received downlink packet $DP_D$ is addressed.

At a step 450, in response to receiving the downlink data packet $DP_D$ addressed to the destination device 306a, the head device 302 forwards the downlink data packet $DP_D$ only to its member device 304a to which the destination device 306a, to which the downlink packet $DP_D$ is addressed, is linked based on the routing table of the head device 302, if the linkage information related to the destination device 306a to which the downlink data packet $DP_D$ is addressed, is stored in the routing table of the head device 302. In other words, if the head device 302 defines at the step 440 that the linkage information related to the destination device 306a, is stored in the routing table of the head device 302, at the step 450 the head device 302 forwards the downlink data packet $DP_D$ only to the member device 304a of the head device 302 to which the destination device 306a is linked based on the routing table of the head device 302. The head device 302 forwards the downlink data packet $DP_D$ to the member device 304a for routing the downlink data packet $DP_D$ to the destination device 306a. FIG. 3C illustrates schematically an example of the downlink routing of the downlink data packet $DP_D$ by the routing system 300 in the downlink direction, wherein the linkage information related to the destination device 306a to which the downlink data packet $DP_D$ is addressed is stored in the routing table of the head device 302. The routing system 300 of the example of FIG. 3C corresponds to the routing system 300 of the example of FIG. 3B, but in the example of FIG. 3C the received data packet is a downlink data packet $DP_D$ that is routed in the downlink direction. In the example of FIG. 3C, the member device 304a is the previous router device 204b in the same branch of the network 202 with the destination device 306a in the downlink direction. Thus, in the example of FIG. 3C after receiving the downlink data packet $DP_D$ from the head device 302, the member device 304a forwards the downlink data packet $DP_D$ to the destination device 306a. Alternatively, the destination device 306a may be in the same branch with the member device 304a, but at least one other router device 204b of the network 202 may be between the member device 304a and the destination device 306a in said branch of the network 202. In that case the downlink data packet $DP_D$ is routed from the member device 304a to the destination device 306a via the at least one other router device 204b of the network 202. FIG. 3D illustrates schematically another example of the downlink routing of the downlink data packet $DP_D$ by the routing system 300 in the downlink direction, wherein the linkage information related to the destination device 306a to which the downlink data packet $DP_D$ is addressed is stored in the routing table of the head device 302. In the example of FIG. 3D, the destination device 306a is in the same branch with the member device 304a, but one other router device 204b of the network 202 is between the member device 304a and the destination device 306a and the downlink data packet $DP_D$ is routed from the member device 304a to the destination device 306a via said one other router device 204b of the network 202.

At a step 460, if the linkage information related to the destination device, to which the downlink data packet $DP_D$ is addressed, is not stored in the routing table of the head device 302, the head device 302 may forward the received downlink data packet $DP_D$ to all its router member devices 304a-304n, i.e. to all member devices 304a-304n of the head device 302 that are operating in the router role, i.e. capable to participate in the routing operations. This may be called as a member limited flooding of the downlink data packet $DP_D$ that may be considered as a special case of the flooding. In other words, if the head device 302 defines at the step 440 that the linkage information related to the destination device 306a, is not stored in the routing table of the head device 302, the head device 302 may forward at the step 460 the received downlink data packet $DP_D$ to all its router member devices 304a-304n. As the addresses of the one or more member devices 304a-304n of the head device 302 are known by the head device 302, the head device 302 may infer that the destination device 306a, to which the downlink data packet $DP_D$ is addressed, is not any of its non-router member devices and thus the head device 302 does not need to forward the received downlink data packet $DP_D$ to its non-router member devices. The same applies also forwarding the downlink data packet $DP_D$ by the router member devices 304a-304n of the head device 302. In the member limited flooding the downlink data packet $DP_D$ reaches every (connected) device in the network 202. FIG. 3E illustrates schematically an example of the downlink routing of the downlink data packet $DP_D$ by the routing system 300 in the downlink direction, wherein the linkage information related to the destination device 306a to which the downlink data packet $DP_D$ is addressed is not stored in the routing table of the head device 302. In other words, FIG. 3F illustrates schematically an example of the member limited flooding of the downlink data packet $DP_D$, if the linkage information related to the destination device 306a to which the downlink data packet $DP_D$ is addressed is not stored in the routing table of the head device 302. In the example of FIG. 3E, all the member devices 304a-304n of the head device 302 are routing member devices and the head device 302 forwards the received downlink data packet $DP_D$ to the router member devices 304a-304n of the head device 302. If the head device 302 alternatively or in addition comprises one or more non-router member devices, the head device 302 does not forward the received downlink data packet $DP_D$ to the non-router member devices of the head device 302. In the member limited flooding, the downlink packet $DP_D$ is forwarded to all router member devices 304a-304n, regardless of the destination device 106 is reached, similarly as in the flooding. Only the non-router devices 204c and possible router devices 204b behind the destination device 306a, if the destination device 306a is a router device having router member devices, may not be concerned in the member limited flooding, similarly as in the flooding.

Alternatively, at a step 470 if the linkage information related to the destination device, to which the downlink data packet $DP_D$ is addressed, is not stored in the routing table of the head device 302, the head device 302 may broadcast the received downlink data packet $DP_D$ to all communication devices within its radio range 308, i.e. the downlink data packet $DP_D$ may be flooded to all communication devices within the radio range 308 of the head device 302. In other words, if the head device 302 defines at the step 440 that the linkage Information related to the destination device 306a, is not stored in the routing table of the head device 302, the head device 302 may broadcast at the step 470 the received downlink data packet $DP_D$ to all communication devices within its radio range 308, i.e. within its neighbourhood including also its router member devices 304a-304n. One method for broadcasting the downlink data packet $DP_D$ may for example be, but is not limited to, in accordance with the method explained in patent publication US 2019/208512 A1. The step 470 may be applied for example only in limited situations. An example of such limited situations may comprise a situation, where the destination device 306a to which the received downlink data packet $DP_D$ is addressed has recently been a member device 304a-304n of the head device 302, but not anymore. Another example of such limited situations may comprise a situation, where the presence of the destination device 306a, to which the received downlink data packet $DP_D$ is addressed, within the radio range of the head device 302 is indicated by one or more neighbouring communication devices of the head device 302. This may be based on assumptions that the recent membership of the destination device 306a, to which the received downlink data packet $DP_D$ is addressed, makes it probable that the destination device 306a has changed its route, but probably not far, e.g. the destination device 306a may currently be associated to a neighbouring branch of the head device 302. FIG. 3F illustrates schematically another example of the downlink routing of the downlink data packet $DP_D$ by the routing system 300 in the downlink direction, wherein the linkage information related to the destination device 306a to which the downlink data packet $DP_D$ is addressed is not stored in the routing table of the head device 302. In other words, FIG. 3F illustrates schematically an example of the flooding of the downlink data packet $DP_D$ by the routing system 300 in the downlink direction, if the linkage information related to the destination device 306a to which the downlink data packet $DP_D$ is addressed is not stored in the routing table of the head device 302. In the example of FIG. 3F, the head device 302 broadcasts the received downlink data packet $DP_D$ to all communication devices 304a-304n, 306a-306n, 310 within its radio range 308. In the example of FIG. 3F, the head device 203 broadcasts the received downlink data packet $DP_D$ to its member devices 304a-304n and to a neighbouring communication device 310 that is not in the same branch with the head device 302 but the neighbouring communication device 310 is within the radio range 308 of the head device 302. The neighbouring communication device 310, in turn, forwards the received downlink data packet $DP_D$ to its member device, which is in this example the destination device 306a, to which the received downlink data packet $DP_D$ is addressed. In the example of FIG. 3F the neighbouring communication device 310 is a router device 204b, but the neighbouring communication device 310 may alternatively be a sink device 204a. Alternatively or in addition, there may exist more than one neighbouring communication device 310 within the radio range 308 of the head device 302, wherein the more than one neighbouring communication device 310 may be a router device(s) 204b, a sink device(s) 204a and/or a non-router device(s) 204c.

The term "neighbouring communication device" means throughout this application a communication device whose transmissions may be correctly received by a receiving communication device. An extended meaning of the term "neighbouring communication device" takes into account the neighbour(s) of the neighbour(s) of the communication device, i.e. multi-hop neighbour(s), such as two-hop neighbour(s), three-hop neighbour(s), four-hop neighbour(s), and/or so on. The term "neighbourhood of a communication device" means throughout this application one or more communication devices whose transmissions may be correctly received by a receiving communication device. An extended meaning of the term "neighbourhood of a communication device" takes into account the neighbour(s) of the neighbour(s) of the communication device, i.e. multi-hop neighbourhood, such as two-hop neighbourhood, three-hop neighbourhood, four-hop neighbourhood, and/or so on.

According to an example, the uplink data packet $DP_U$ generated by the destination device 306a may comprise a hop-count field comprising a hop-count value. The hop-count value may be incremented by every router device 204b of the network 202 that forwards the uplink data packet $DP_U$, when the uplink data packet $DP_U$ is routed in the uplink direction in the network 202.

According to another example, the downlink data packet $DP_D$ addressed to the destination device 306a may comprise a downlink hop-limit field comprising a hop-limit value. The hop-limit value may initially be adapted to correspond to the cumulated hop-count value comprised in the hop-count field of the uplink data packet, if the uplink data packet $DP_U$ generated by said destination device 306a comprises the hop-count field. The hop-limit value may be decremented by every router device 204b of the network that forwards the downlink data packet $DP_D$. When a router device 204b receives the downlink data packet $DP_D$ with the hop-count value being zero, said router device 204b does not forward the downlink data packet $DP_D$, unless the downlink data packet $DP_D$ is addressed to a member device of said router device 204b.

Alternatively or in addition, according yet another example, the destination device 306a may generate the uplink data packet $DP_U$ received by the head device 302 at the step 410 in response to receiving a downlink indication packet. The downlink indication packet may for example be generated by at least one sink device 204a of the network 202. According to an example, the at least one sink device 204a of the network 202 may generate the downlink indication packet in response to receiving a request from the managing entity of the one or more external network 206 via the gateway device 205. The downlink indication packet may for example be delivered to the destination device 306a by using the flooding mechanism, i.e. the downlink indication packet may be delivered to the destination device 306a by forwarding, the downlink indication packet to all router devices 204a, 204b of the network 202. After receiving the uplink data packet $DP_U$ generated by the destination device 306a in response to receiving the flooded downlink indication packet, the head device 302 may forward one or more subsequent downlink data packets (including the downlink data packet $DP_D$) addressed to the destination device 306a based on the linkage information stored in the routing table of the head device 302 as described above referring to the steps 410-450. According to an example, the downlink indication packet may be any downlink packet causing an uplink packet transmission response. According to another example, the downlink indication packet may be a dedicated downlink poll packet (e.g. the downlink ARQ poll packet) or an ARQ poll message may be piggy backed into any downlink packet. According to yet another example, the downlink indication packet may be a downlink packet (e.g. a downlink data packet, a downlink control packet or any other downlink packet), comprising an indicator (e.g. a flag, a bit field, or any other indicator) indicating that there is further data coming for the destination device 306a, e.g. one or more downlink data packets. The indicator may for example be included in the header of the downlink indication packet. The use of the downlink indication packet is especially beneficial in cases where the downlink indication packet is a part of a burst of downlink data packets (e.g. if the downlink data packet $DP_D$ addressed to the destination device 306a is segmented into a plurality of downlink data packets forming the burst of downlink data packets). For example, in case of the burst of the downlink data packets, the downlink indication packet may comprise the indicator indicating that the downlink indication packet is a fragment, e.g. a first or a middle fragment, of the burst of the downlink data packets. The use of the downlink indication packet improves the performance of the wireless network 202 by improving the downlink data packet routing efficiency, because only the downlink indication packet indicating that there is further data coming for the destination device 306a needs to be delivered to the destination device 306a by using the flooding mechanism and the downlink data packet $DP_D$ addressed to the destination device 306a and possibly also one or more subsequent downlink data packets addressed to the destination device 306a may be delivered to the destination device 306a by forwarding the downlink data packet(s) only to the relevant router devices 204b based on the linkage information stored in the routing table of the head device 302 as described above referring to the steps 410-450. According to yet another example, the destination device 306a may generate uplink data packets $DP_U$ regularly. The periodicity of the regular uplink data packet generation may for example be defined based on the maximum storing time information indicted discussed above.

The routing system 300 and the routing method as above has been explained improve a downlink data packet routing efficiency in the wireless communication network 202. The greatest improvement in the downlink data packet routing efficiency in the network 202 may be achieved by applying the features of the routing method relevant to the head device 302 by all sink devices 204a and all router devices 204b of the network 202, especially in networks 202 where the mobility of the devices 204a, 204b, 204c is substantially low. On the other hand, if the features of the routing method relevant to the head device 302 are applied only by one device of the network 202, preferably the features of the routing method relevant to the head device 302 may be applied by the sink device 204a of the network 202 to achieve the maximum possible improvement of the downlink data packet routing efficiency in the network 202.

Figure 5:
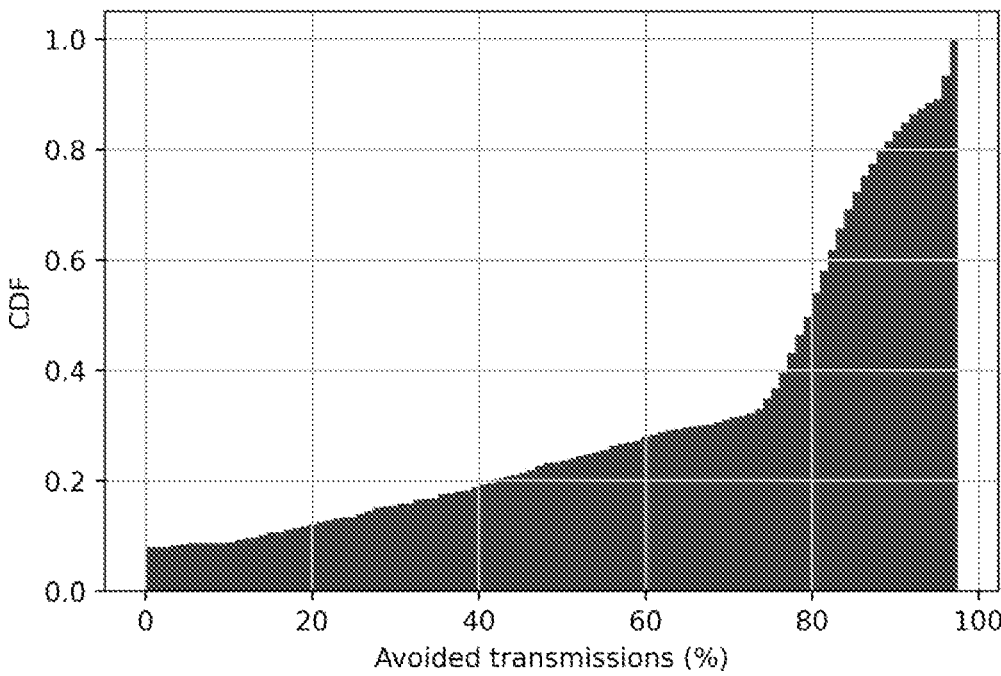
FIG. 5 illustrates schematically an example of a simulated performance of the routing method.

The improved performance, i.e. the improved downlink data packet routing efficiency, of the above-described routing method in comparison to the member limited flooding-based routing method is demonstrated by an example simulation with an example single sink device network 202 comprising 500 communication devices 204a, 204b, 204c. In the member limited flooding-based routing method each downlink data packet is forwarded, i.e. flooded, to all router devices 204a, 204b of the network 202. In this example simulation the features of the routing method relevant to the head device 302 as above has been explained are applied only by the sink device 204a of the example network 202. FIG. 5 illustrates schematically the simulated performance between the above-described routing method and the member limited flooding-based routing method as a cumulative distribution function (CDF). The performance metric in the example of FIG. 5 is the percentage of avoided transmissions when the above-described routing method is used versus using the member limited flooding-based routing method. The percentage of the avoided transmissions is defined by the following equation:

$$\text{Avoided transmissions } (\%) = \frac{N_F - N_R}{N_R},$$

Wherein $N_F$ is the number of transmissions in the member limited flooding-based routing method, and $N_R$ is the number of transmissions in the above-described routing method. FIG. 5 shows that that applying the features of the routing method relevant to the head device 302 by the sink device 204a saves 80% of the transmissions, 50% of the times. If the features of the routing method relevant to the head device 302 are further applied by one or more routing devices 204b of the network 202, the performance metric may be improved even further.

Figure 6:
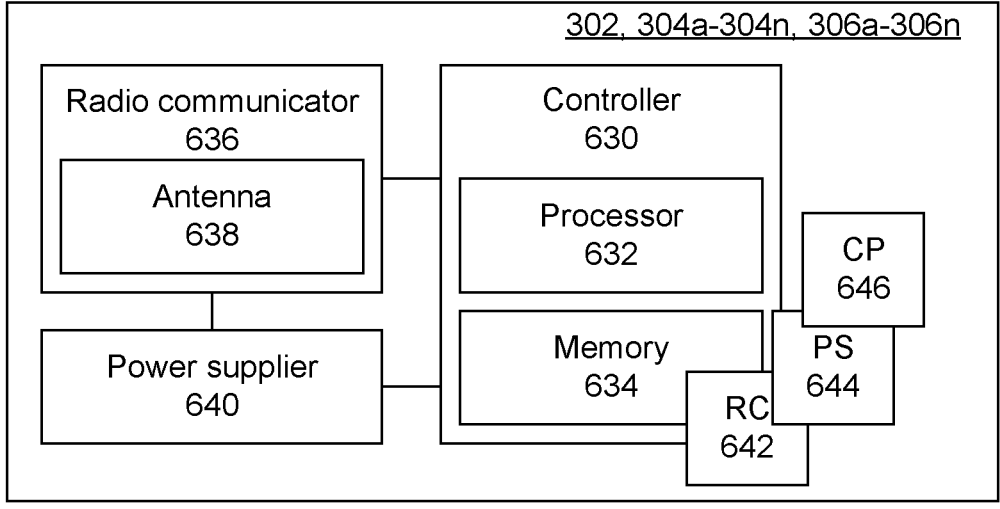
FIG. 6 illustrates schematically an example of operational parts of a wireless radio communication device.

FIG. 6 illustrates schematically a communication device 302, 304a-304n, 306a-306n that is able to communicate in the network 202 and to perform the relevant features (steps) of the routing method as above has been explained. In other words, the device that is able to operate as the head device 302 and to perform the features of the routing method relevant to the head device 302 as above has been explained, as the member device 304a-304n and to perform the features of the routing method relevant to the member device 304a-304n as above has been explained, and/or as the destination device 306a-306n and to perform the features of the routing method relevant to the destination device 306a-306n as above has been explained.

The device 302, 304a-304n, 306a-306n comprises the controller (control part) 630 that controls operations of its parts 632, 634, 636, 638, 640 so that the device 302, 304a-304n, 306a-306n operates as above has been explained.

The controller 630 comprises a processor (processor part) 632 that performs operator-initiated and/or computer program-initiated instructions, and processes data in order to run applications. The processor 632 may comprise at least one processor, e.g. one, two, three, four, or more processors.

The controller 630 also comprises the memory (memory part) 634 in order to store and to maintain data. The data may be instructions, computer programs, and data files. The memory 634 comprises at least one memory, e.g. one, two, three, four, or more memories.

The device 302, 304a-304n, 306a-306n also comprises the radio communicator (radio communication part, data transferer) 636 and an antenna (antenna part) 638 that the controller 630 uses in order to send commands, requests, messages, and data (e.g. data packets) to at least one of devices in the routing system 300 and/or in the network 202 via the antenna 638. The radio communicator 636 also receives commands, requests, and data (e.g. data packets) from at least one of devices in the routing system 300 and/or in the network 202 via the antenna 638. The communication between the radio communicator 636 of the device 302, 304a-304n, 306a-306n and other device in the routing system 300 and/or in the network 202 is provided through the antenna 638 wirelessly.

The device 302, 304a-304n, 306a-306n may further comprise a power supplier (power supply part) 640. The power supplier 640 comprises components for powering the device 302, 304a-304n, 306a-306n, e.g. a battery and a regulator.

The memory 634 stores at least a radio communication application 642 for operating (controlling) the radio communicator 636, and a power supply application 644 for operating the power supplier 640.

The memory 634 also stores a computer program (computer software, computer application) 646, which uses at least one of parts 636, 638, 640 in order to perform at least the operations of the device 302, 304a-304n, 306a-306n explained above in context of the previous figures, when it is executed (run) in a computer, e.g. in the device 302, 304a-304n, 306a-306n, by means of the controller 630.

The computer program 646 may be stored in a tangible, non-volatile computer-readable storage medium, e.g. a Compact Disc (CD) or Universal Serial Bus (USB)-type storage device.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A routing system for a wireless communication network comprising a plurality of communication devices, the routing system comprises:
   one or more head devices participating in routing operations in the wireless communication network, each head device having one or more member devices, and one or more destination devices,
   wherein the one or more head devices the one or more member devices, and the one or more destination devices belong to the plurality of communication devices, and
   wherein at least one head device of the one or more head devices is configured to:
      in response to receiving from a member device belonging to its one or more member devices an uplink data packet (DPU) generated by a destination device belonging to the one or more destination devices, forward the received uplink data packet (DPU) in the uplink direction and store into a routing table linkage information representing a linkage of said destination device to said member device;
      in response to receiving a downlink data packet (DPD) addressed to a destination device belonging to the one or more destination devices, forward the downlink data packet (DPD) only to its member device to which the destination device, to which the downlink data packet (DPD) is addressed, is linked based on the routing table of the head device, if linkage information related to the destination device, to which the downlink data packet (DPD) is addressed, is stored in the routing table of the head device); and
      update the routing table, wherein the updating of the routing table comprises prioritizing the storing of the linkage information based on Quality of service (QoS) value comprised in the linkage information and/or downlink response information comprised in the linkage information.

2. The routing system according to claim 1, wherein if the linkage information related to the destination device, to which the downlink data packet (DPD) is addressed, is not stored in the routing table of the head device, the head device is configured to:
   forward the received downlink data packet (DPD) to all its router member devices, or broadcast the received downlink data packet (DPD) to all communication devices within its radio range including its router member devices.

3. The routing system according to claim 1 wherein the linkage information comprises at least information linking an address of said destination device to an address of said member device.

4. The routing system according to claim 1 wherein the at least one head device is a router device operating in a router role in the wireless communication network or a sink device configured to operate as a radio interface for a gateway device operating as a gateway between the wireless communication network and one or more external networks.

5. The routing system according to claim 4, wherein the head device being the sink device is configured to store the routing table into or to send the routing table to be stored in a memory unit of a managing entity of the one or more external networks.

6. The routing system according to claim 1, wherein the updating of the routing table further comprises:

removing the stored linkage information from the routing table based on time elapsed from the storing of said linkage information;

updating previously stored linkage information with new linkage information in response to receiving the new linkage information;

removing oldest linkage information from the routing table, if a maximum size of the routing table is reached; and/or learning when storing of new linkage information should be done based on a routing header of a packet header of the received uplink data packet (DPU).

7. The routing system according to claim 1, wherein the downlink response information indicates whether a downlink response is required or not.

8. The routing system according to claim 7, wherein the downlink response information comprises a higher layer protocol indication indicating that a downlink response is expected.

9. The routing system according to claim 8, wherein the higher layer protocol indication comprises an indication that the uplink data packet (DPU) is an uplink Automatic Repeat Request (ARQ) poll packet.

10. The routing system according to claim 1, wherein the uplink data packet (DPU) comprises a hop-count field comprising a hop-count value, the hop-count value is incremented by every router device of the wireless communication network that forwards the uplink data packet (DPU).

11. The routing system according to claim 10, wherein the downlink data packet (DPD) comprises a downlink hop-limit field comprising a hop-limit value, the hop-limit value is initially adapted to correspond to the cumulated hop-count value comprised in the hop-count field of the uplink data packet (DPU).

12. The routing system according to claim 11, wherein the hop-limit value is decremented by every router device of the wireless communication system that forwards the downlink data packet (DPD), and when a router device of the wireless communication system receives the downlink data packet with the hop-count value being zero, said router device does not forward the downlink data packet (DPD), unless the downlink data packet (DPD) is addressed to a member device of said router device.

13. The routing system according to claim 1, wherein the destination device is configured to generate the uplink data packet (DPU) in response to receiving a downlink indication packet.

14. The routing system according to claim 13, wherein the downlink indication packet is delivered to the destination device by flooding, and wherein after receiving the uplink data packet (DPU) generated by the destination device in response to receiving the downlink indication packet the head device is configured to forward one or more subsequent downlink data packets addressed to the destination device based on the linkage information stored in the routing table of the head device.

15. A wireless communication network comprising the routing system according to claim 1.

16. A routing method for a wireless communication network, the method comprises following steps of:

presenting one or more head devices participating in routing operations in the wireless communication network, each head device having one or more member devices, and one or more destination devices, wherein the one or more head devices, the one or more member devices, and the one or more destination devices belong to a plurality of communication devices of the wireless communication network;

in response to receiving, by at least one head device, from a member device belonging to its one or more member devices an uplink data packet (DPU) generated by a destination device belonging to the one or more destination devices, forwarding, by the at least one router device, the received uplink data packet (DPU) in the uplink direction and storing into a routing table linkage information representing a linkage of said destination device to said member device;

in response to receiving, by the at least one head device, a downlink data packet (DPD) addressed to a destination device belonging to the one or more destination devices, forwarding, by the at least one head device, the downlink data packet (DPD) only to its member device to which the destination device, to which the downlink packet (DPD) is addressed, is linked based on the routing table of the head device, if linkage information related to the destination device, to which the downlink data packet (DPD) is addressed, is stored in the routing table of the head device; and updating, by the at least one head device, the routing table, wherein the updating of the routing table comprises prioritizing the storing of the linkage information based on Quality of service (QoS) value comprised in the linkage information and/or downlink response information comprised in the linkage information.

17. A head device for a wireless communication network, wherein head device is configured to participate in routing operations in the wireless communication network, the head device comprises:

a controller, and a radio communicator for operating as a radio node device, wherein the head device is configured to:

in response to receiving, by the radio communicator, from a member device belonging to its one or more member devices an uplink data packet (DPU) generated by a destination device, forward, by the radio communicator, the received uplink data packet (DPU) in the uplink direction and store, by the controller, into a routing table linkage information representing a linkage of said destination device to said member device;

in response to receiving, by the radio communicator, a downlink data packet (DPD) addressed to a destination device, forward, by the radio communicator, the downlink data packet (DPD) only to its member device to which the destination device, to which the downlink data packet (DPD) is addressed, is linked based on the routing table of the head device, if linkage information related to the destination device, to which the downlink data packet (DPD) is addressed, is stored in the routing table of the head device; and update, by the controller, the routing table, wherein the updating of the routing table comprises prioritizing the storing of the linkage information based on Quality of service (QoS) value comprised in the linkage information and/or downlink response information comprised in the linkage information.

18. A routing method for the head device according to claim 17, wherein the method comprises following steps of:

in response to receiving, by a radio communicator of the head device, from a member device belonging to its one or more member devices an uplink data packet (DPU) generated by a destination device, forwarding, by the radio communicator of the head device, the received uplink data packet (DPU) in the uplink direction and storing, by the controller of the head device, into a routing table linkage information representing a linkage of said destination device to said member device;

in response to receiving, by the radio communicator of the head device, a downlink data packet (DPD) addressed to a destination device, forwarding, by the radio communicator of the head device, the downlink data packet (DPD) only to its member device to which the destination device, to which the downlink data packet (DPD) is addressed, is linked based on the routing table of the head device, if linkage information related to the destination device, to which the downlink data packet (DPD) is addressed, is stored in the routing table of the head device, and updating, by the controller of the head device, the routing table, wherein the updating of the routing table comprises prioritizing the storing of the linkage information based on Quality of service (QoS) value comprised in the linkage information and/or downlink response information comprised in the linkage information.

19. A tangible non-transitory computer-readable medium comprising a computer program that comprises instructions, which, when the computer program is executed by a computer, cause the computer to carry out at least the steps of the method according to claim 18.

\* \* \* \* \*